(12) United States Patent
Young et al.

(10) Patent No.: US 12,261,873 B2
(45) Date of Patent: Mar. 25, 2025

(54) AUGMENTED AND VIRTUAL REALITY SECURITY PLANNER

(71) Applicant: Bank of America Corporation, Charlotte, NC (US)

(72) Inventors: Michael Young, Davidson, NC (US); Anthony D. Lange, Washington, DC (US); Tarsha Salley, Charlotte, NC (US); Joshua Shi, Chicago, IL (US); Madeline Deneen Fest, Charlotte, NC (US); Adam King, Fort Mill, SC (US); Henrry Batista, Chicago, IL (US)

(73) Assignee: Bank of America Corporation, Charlotte, NC (US)

(*) Notice: Subject to any disclaimer, the term of this patent is extended or adjusted under 35 U.S.C. 154(b) by 264 days.

(21) Appl. No.: 18/128,440

(22) Filed: Mar. 30, 2023

(65) Prior Publication Data

US 2024/0333744 A1    Oct. 3, 2024

(51) Int. Cl.
  *H04L 9/40* (2022.01)
  *G06F 21/57* (2013.01)
  (Continued)

(52) U.S. Cl.
  CPC ........ *H04L 63/1433* (2013.01); *G06F 21/577* (2013.01); *H04L 41/22* (2013.01); *H04L 43/045* (2013.01); *H04L 63/20* (2013.01); *G06T 19/006* (2013.01); *H04L 41/024* (2013.01); *H04L 41/0866* (2013.01)

(58) Field of Classification Search
  CPC ... G06F 21/577; G06T 19/006; H04L 41/024; H04L 41/0866; H04L 41/22; H04L 43/045; H04L 63/1433; H04L 63/20
  See application file for complete search history.

(56) References Cited

U.S. PATENT DOCUMENTS 9,557,807 B2 * 1/2017 Mick ..................... G06Q 10/06
9,659,251 B2   5/2017 Tang et al.
(Continued)

OTHER PUBLICATIONS

Bohm, Fabian, et al. "Augmented reality and the digital twin: State-of-the-art and perspectives for cybersecurity." Journal of Cybersecurity and Privacy 1.3: 519-538. (Year: 2021).*

(Continued)

*Primary Examiner* — John M MacIlwinen
(74) *Attorney, Agent, or Firm* — Weiss & Arons LLP

(57) ABSTRACT

A system for network augmentation using virtual reality is provided. The system may include uploading data relating to a network, to a network augmentation system. The system may include retrieving data relating to network standards. The system may include retrieving data relating to historical network vulnerabilities. The system may include an artificial intelligence ("AI") module. The AI module may be configured to analyze the network and determine possible network vulnerabilities. The AI module may be configured to output a three-dimensional map of the network to a display module. The three-dimensional map may be displayed on the display module. The three-dimensional map may include the identified possible network vulnerabilities. The system may be further configured to overlay solutions to the possible network vulnerabilities on the three-dimensional map.

20 Claims, 7 Drawing Sheets

(51) Int. Cl.
*G06T 19/00* (2011.01)
*H04L 41/02* (2022.01)
*H04L 41/0866* (2022.01)
*H04L 41/22* (2022.01)
*H04L 43/045* (2022.01)

(56) References Cited

U.S. PATENT DOCUMENTS

| | | | | |
|---|---|---|---|---|
| 10,178,130 | B2* | 1/2019 | Apvrille | H04L 63/20 |
| 10,972,361 | B2* | 4/2021 | Lairsey | H04W 76/10 |
| 11,924,022 | B2* | 3/2024 | Thakkar | H04L 43/0817 |
| 2016/0219078 | A1* | 7/2016 | Porras | H04L 63/1416 |
| 2017/0116421 | A1* | 4/2017 | M C | G06F 21/577 |
| 2020/0342676 | A1* | 10/2020 | Koohmarey | H04L 67/12 |
| 2022/0342998 | A1 | 10/2022 | Singh | |
| 2023/0064373 | A1* | 3/2023 | Starr | G06F 21/577 |
| 2024/0273214 | A1* | 8/2024 | Bolukbas | G06F 21/577 |

OTHER PUBLICATIONS

Gopireddy, Satheesh Reddy. "Augmented Reality (AR) for Cloud Security Operations and Monitoring." European Journal of Advances in Engineering and Technology 7.12: 128-132. (Year: 2020).*

Revolti, Andrea, et al. "Augmented Reality to support the maintenance of urban-line infrastructures: A case study." Procedia Computer Science 217: 746-755. January. (Year: 2023).*

Striegel, Martin, et al. "EyeSec: A Retrofittable Augmented Reality Tool for Troubleshooting Wireless Sensor Networks in the Field." arXiv preprint arXiv:1907.12364. (Year: 2019).*

Sukhija, Nitin, Cory Haser, and Elizabeth Bautista. "Employing Augmented Reality for Cybersecurity Operations in High Performance Computing Environments." Practice and Experience in Advanced Research Computing on Rise of the Machines. 1-4. (Year: 2018).*

* cited by examiner

AUGMENTED AND VIRTUAL REALITY SECURITY PLANNER

FIELD OF TECHNOLOGY

The field of technology relates to virtual augmentation.

BACKGROUND OF THE DISCLOSURE

Entities may use one or more computing networks as part of an enterprise computing system. Computing networks may be large networks. Computing networks may be complex networks. Computing networks may include different components. Computing network components may include end components, edge components, central components, communication channels, connection channels and any other suitable network component. The network components may be included in various physical locations. There may be large distances between the physical locations.

Communication channels components may be wireless communication channels. Wireless channels may include Bluetooth®, Wi-Fi® and/or any other suitable wireless network communication channels.

Connection channel components may be physical connection channels. Physical connection channels may include cables, wires and/or any other suitable physical connection channels.

Because of the size and complexity of computing networks and/or enterprise computing systems, there may be locations of possible vulnerabilities within the network. Examples of vulnerabilities may include unsecured connection channels, end-point components that are disconnected from the network, faulty communication channels and any other suitable network vulnerability. Because of the size and complexity of the network, it may be difficult to identify the security vulnerabilities. Therefore, it would be desirable to provide a system that identifies security vulnerabilities within a network.

It would be further desirable to provide an immersive and interactive system for identifying security vulnerabilities within a network. It would be further desirable to harness augmented reality capability features in order to portray a network as a three-dimensional map. Such an augmented reality-enhanced three-dimensional map may be desirable to understand the network and its vulnerabilities, and to identify solutions to the network vulnerabilities. It would be further desirable for the immersive and interactive system, using the augmented reality enhanced three-dimensional map, to predict and overlay network solutions for the identified vulnerabilities.

SUMMARY OF THE DISCLOSURE

Systems, apparatus, and methods for an augmented and virtual reality security planner are provided. Methods may include inputting network architecture data into a network augmentation system.

The network augmentation system may include hardware components. The network augmentation system may include software components. The network augmentation system may include a computing device. The network augmentation system may include a hardware processor. The network augmentation system may include a hardware memory. The network augmentation system may include an artificial intelligence ("AI") module. The network augmentation system may include a user interface. The network augmentation system may include a display module. The user interface may be coupled to or a component of the display module. The display module may be a screen, virtual reality headset or any other suitable display module. The network augmentation system may include any other suitable components.

The network architecture data may include data relating to a network. The network architecture data may include physical data. The network architecture data may include digital data. The network architecture data may include digitalized data.

An example of physical data may include a plurality of physical network component images.

Examples of digital data may include a plurality of digital network systems maps and a plurality of digital network configurations maps. Digital data may include digital mappings of the connections that are included in the network. Digital data may include digital mappings of end points within the network.

Examples of digitized data may include a plurality of digital images that correspond to network systems physical maps and a plurality of digital images that correspond to network configurations physical maps. Digitized data may include physical mappings of the connections that are included in the network that are scanned and digitalized. Digitized data may include physical mappings of end points within the network that are scanned and digitized.

The network augmentation system may upload, and/or enable the upload of the digital network architecture data. The digital network architecture data may be uploaded from a digital source, an internet location, or any other suitable location. The network augmentation system may digitize or scan the physical network architecture data. The network architecture may convert the scans of the physical network architecture data into digital images.

Methods may include retrieving data relating to cybersecurity standards. Methods may include retrieving data relating to network security standards. Data relating to cybersecurity and network security may be retrieved from a public database. Cybersecurity and network security standards may be industry related standards. The industry related standards may include standards from the National Institute of Standards and Technology ("NIST"). The industry related standards may include standards from MITRE ATT&CK® (hereinafter, "MITRE"). MITRE ATT&CK® stands for MITRE Adversarial Tactics, Techniques, and Common Knowledge (ATT&CK). The MITRE ATT&CK framework is a curated knowledge base and model for cyber adversary behavior, reflecting the various phases of an adversary's attack lifecycle and the platforms they are known to target.

Methods may include retrieving from a public database publicly stored data relating to standard network vulnerabilities. Standard network vulnerabilities may be data collected relating to general security vulnerabilities that any network can encounter.

Methods may include retrieving from a private database privately stored data relating to historical network vulnerabilities. The historical vulnerabilities may have occurred within the network. The private database may be located at the memory. The memory may be included in the network. The memory module may operate in tandem with a hardware processor.

Methods may include rendering a three-dimensional map of the network. The network augmentation system may render the three-dimensional map using the network architecture data. The network augmentation system may use the AI module to render the three-dimensional map. The network augmentation system may display the three-dimensional map on the interactive display module.

Methods may include identifying one or more security vulnerabilities applicable to the network. The network may include a plurality of connection points. The connection points may be a connection between two end points. End points may include data centers, call centers, nodes, electronic devices and/or any other suitable end point. The end points may be connected via connection channels. The connection channels may include routers, gateways, switches, cables and/or any other suitable connection channel.

One or more of the pluralities of connection points and connection channels may allow for potential security vulnerabilities. Potential security vulnerabilities may include potential intrusion points. Potential intrusion points may include connection points or channels in the network where a person of malicious intent can breach the network. Potential intrusion points may include connection points or channels that measure less than a threshold level of security. Potential intrusion points may include any suitable vulnerability within the connection points and channels.

Methods may include identifying one or more security vulnerabilities based on the data relating to cybersecurity standards retrieved by the network augmentation system. Methods may include identifying one or more security vulnerabilities based on the data relating to network security standards retrieved by the network augmentation system. Methods may include identifying one or more security vulnerabilities based on the publicly stored data retrieved by the network augmentation system. Methods may include identifying one or more security vulnerabilities based on the privately stored data retrieved by the network augmentation system.

Methods may include mapping one or more security vulnerabilities as an overlay to the three-dimensional map. Methods may include tagging each identified security vulnerability with a tag icon. The tag icons may be togglable. A user may decide to view select security vulnerabilities. A user may toggle select tag icons to view selected vulnerabilities.

The one or more security vulnerabilities may be prioritized. The one or more security vulnerabilities may be prioritized based on a priority list. The priority list may be generated using metadata associated with the publicly stored data and the privately stored data. Publicly stored data and privately stored data may have associated metadata. The metadata may include a security threat level corresponding to the data. The network augmentation system may sort the identified security vulnerabilities based on the security threat level included in the metadata.

The metadata may include severity metrics of an identified security vulnerability. The metadata may include an outcome of an identified security vulnerability. The metadata may include a resolution to an identified security vulnerability. The metadata may include any other security vulnerability related information.

Vulnerabilities that are determined to have a higher security threat level with respect to a predetermined threshold security level may be prioritized higher on the priority list. Vulnerabilities that are determined to have a lower security threat level in respect to a predetermined threshold security level may be placed lower on the priority list.

Methods may include selecting a number of identified security vulnerabilities from the priority list. Methods may include identifying using the AI module one or more network solutions for each of the selected vulnerabilities. Solutions may include reinstating connection points or channels to include more secure connections. Solutions may include removing a connection point from the network. Solutions may include any other suitable solution.

Methods may include layering, on the three-dimensional map, the one or more network solutions at network locations that correspond to the selected vulnerabilities. Methods may include forecasting within the three-dimensional map, one or more possible ways the network will be affected in response to the one or more network solutions.

Methods may include selecting through the display module, a solution from the one or more solutions layered on the three-dimensional map. The selection may be influenced by the forecasting of how the solution will affect the network. Methods may include outputting the selected solution to an implementation module. The implementation module may be a computing device included in the network. The computing device may have a hardware processor. The computing device may be a desktop, laptop, mobile device, tablet, or any other suitable computing device. Methods may include implementing the selected solution using the implementation module.

Methods may include displaying a user of the network augmentation system as an icon within the three-dimensional map. Each of the one or more users of the network augmentation system may be represented by a unique icon within the three-dimensional map. A first user may see a second user, within the three-dimensional map, as an icon.

Methods may include interacting in real time between the network augmentation system and the network. The network augmentation system may implement the solution in the network.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
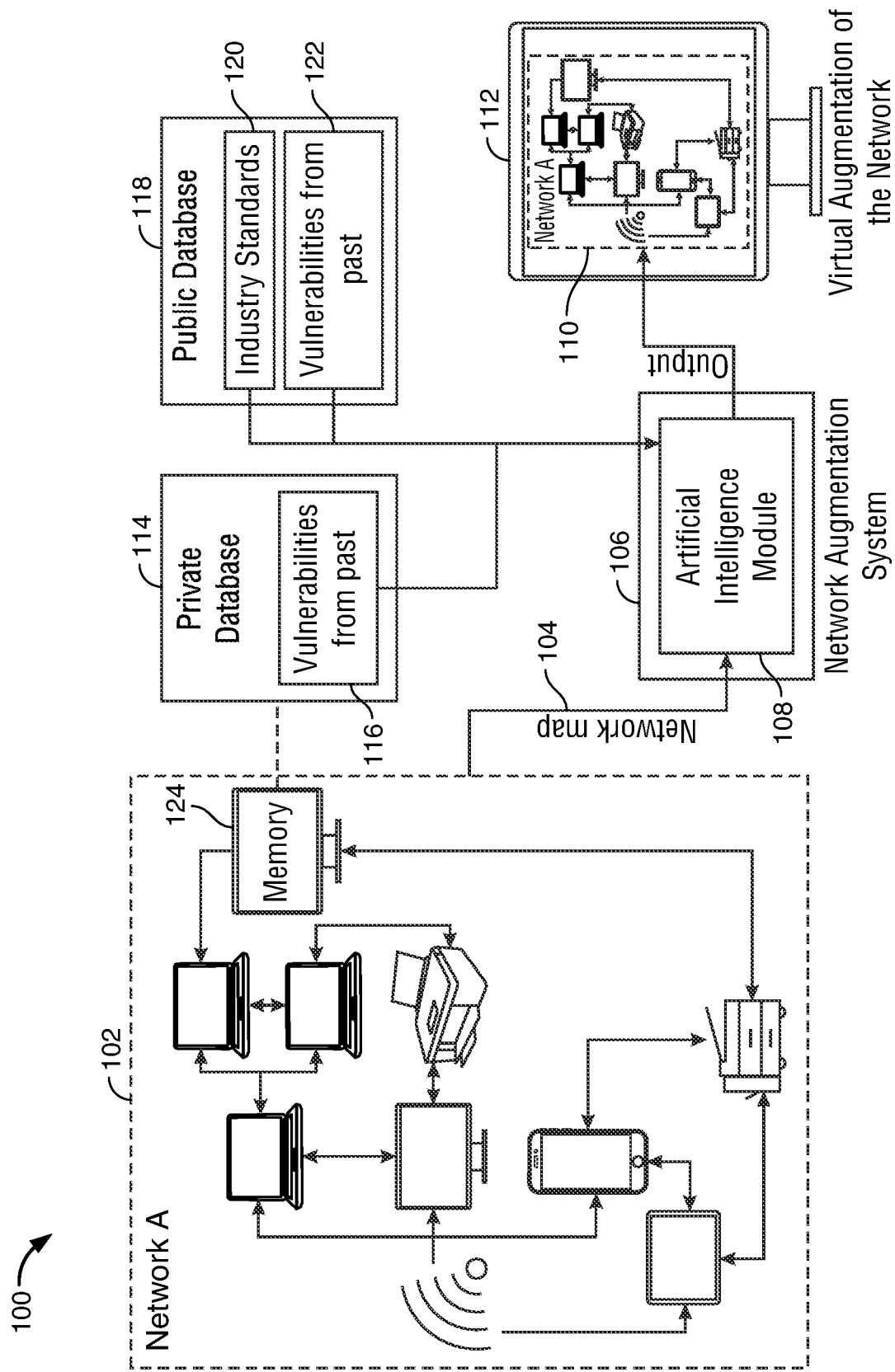
FIG. 1 shows an illustrative diagram in accordance with principles of the invention.

Apparatus, methods, and systems for an augmented and virtual reality security planner are provided. The apparatus may include a network. The network may be an edge network. The network may be a wide area network ("WAN"). The network may be a local area network ("LAN"). The network may be any suitable kind of network.

The network may include physical components. Physical components may include computing devices, printers, tablets, mobile devices, and any other suitable network components. The network may include connections. The connections may include wireless connections. Wireless connections may include Bluetooth® connections, Wi-Fi® connections, satellite connections and any other suitable wireless connections. Connections may include cable connections. The connections may connect one physical component to another physical component in the network. The connections may connect a plurality of physical components within the network.

Computing devices included in the network may include one or more of the following natural computing components: RAM, ROM, input/output modules, non-transitory memory, nonvolatile memory, processors, EEPROM, or any other suitable computing components. The memory may store operating systems, application systems, data, video, text, and/or audio assistance files.

The apparatus may include a public database. The public database may be located at a location on the internet. The public database may include public data. The public database may be configured for retrieval of cybersecurity standards. The public database may be configured for retrieval of network security standards. Cybersecurity and network security standards may include NIST and MITRE. Cybersecurity and network security standards may include any other suitable standards. The public database may be configured for retrieval of publicly stored data relating to standard network vulnerabilities.

The apparatus may include a private database. The private database may be included in the network. The private database may be a secure database. The private database may be configured for retrieval of privately stored data relating to historical vulnerabilities. The historical vulnerabilities may be historical vulnerabilities having occurred within the network.

The apparatus may include a network augmentation system. The network augmentation system may include a computing device. The network augmentation system may include a desktop, laptop, mobile device, smart phone, tablet, or any other suitable mobile devices.

The network augmentation system may include all or some of natural computing components. The computing device may include some or all of the following: RAM, ROM, input/output modules, non-transitory memory, nonvolatile memory, processors, EEPROM, or any other suitable computing components. The memory may store operating systems, application systems, data, video, text, and/or audio assistance files. The network augmentation system may include an artificial intelligence module.

The network augmentation system may include a display module. The display module may be a screen, virtual reality headset, or any other suitable display module. The display module may be configured to display three-dimensional images. A user of the display module may appear as an icon within the three-dimensional when using the network augmentation system.

The network augmentation system may be configured to input data relating to the architecture of the network. The network architecture data may include physical data. The network architecture data may include digital data. The network architecture may include a plurality of physical network component images, digital network systems and configuration maps, and digital images that correspond to network systems and configuration physical maps.

The network augmentation system may be configured to render a three-dimensional map of the network using the network architecture data. The network architecture system may be configured to display the three-dimensional map on the display module.

The network augmentation system may be configured to identify one or more security vulnerabilities. The security vulnerabilities may be identified using the data relating to cybersecurity standards, network security standards, publicly stored data, and privately stored data, retrieved by the AI module. The network augmentation system may map the identified security vulnerabilities as an overlay on the three-dimensional map. The network vulnerabilities may be represented as tags on the three-dimensional network. The tags may be togglable, allowing a user to choose which of the vulnerabilities to view.

The network augmentation system may use the AI module to prioritize the identified security vulnerabilities in a priority list. There may be a lot of identified security vulnerabilities. Many of the security vulnerabilities may not affect network security. A user may be able to focus on some of the security vulnerabilities. The prioritized priority list may list high-level security vulnerabilities before listing low level security vulnerabilities. The vulnerabilities may be prioritized using metadata included with the identified security vulnerabilities. The metadata of a security vulnerability may include severity metrics of the security vulnerability, the frequency of the security vulnerability, the outcome of the selected security vulnerability, a resolution to the identified security vulnerability, or any other suitable metadata.

The network augmentation system may include a user interface. The user interface may be included in the display module. A user may select through the user interface, several vulnerabilities from the priority list. The network augmentation system may use the AI module to identify possible solutions for the selected security vulnerabilities. The network augmentation system may display the solutions on the three-dimensional map as a new layer. The network augmentation system may simulate the changes that will be caused by the identified network solutions.

A user may select through the user interface which solution is most desirable for implementation. The network augmentation system may output the selected solution to an implementation module. The implementation may be any suitable computing device. The implementation may be included in the network. The implementation module may have direct communication with the network. The network may have real time communication with the network augmentation system. The selected solution may be implemented at the implementation module.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The steps of methods may be performed in an order other than the order shown or described herein. Embodiments may omit steps shown or described in connection with illustrative methods. Embodiments may include steps that are neither shown nor described in connection with illustrative methods.

FIG. 1 shows an illustrative embodiment of network augmentation process 100. Network augmentation process 100 may include network 102. Network 102 may include end points. End points may include computing devices or any other suitable network end point. Network 102 may include connection channels. Connection channels may connect end points within the network. Network 102 may include memory 124.

Network augmentation process 100 may include network augmentation system 106. Network augmentation 106 system may include a computing device. Network augmentation system 106 may include artificial intelligence module 108. Network augmentation system 106 may be configured to receive network map 104 from network 102. Network map 104 may include digital and physical maps of the network.

Network augmentation system 106 may be configured to retrieve data from public database 118. Data may include data 120 and data 122. Data 120 may include retrieving cybersecurity and network security standards. Data 120 may include publicly available data relating to standard network vulnerabilities. Network augmentation system 106 may be configured to retrieve data 116 from private database 114. Data 116 may include data relating to historical network vulnerabilities from network 102. Private database 114 may be stored in a computing device included in network 102.

Network augmentation process 100 may include display module 112. Network augmentation system 106 may be configured to render three-dimensional map 110 of network 102. Network augmentation system 106 may be configured to display three-dimensional map 110 on display module 112.

Figure 2:
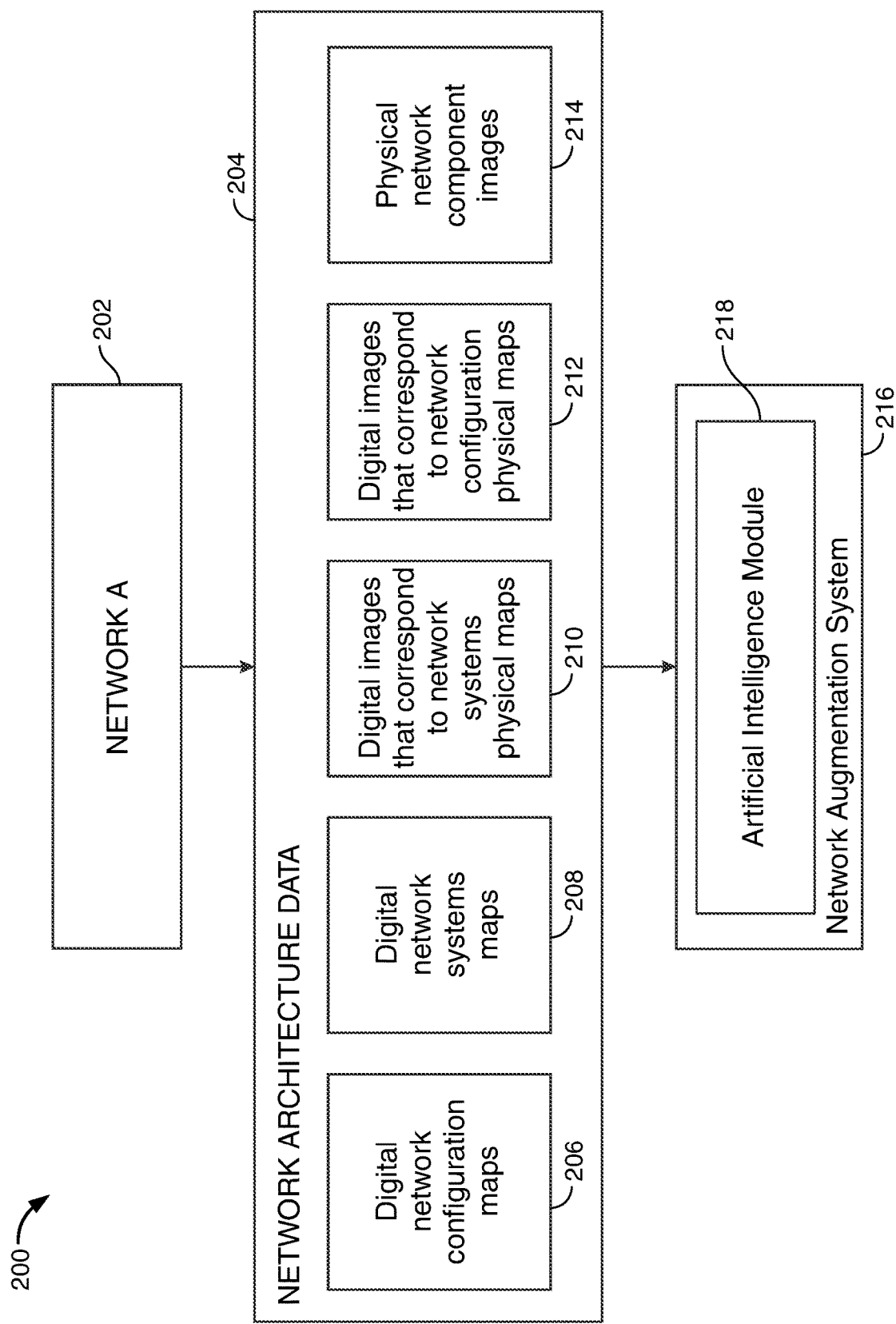
FIG. 2 shows another illustrative diagram in accordance with principles of the invention.

FIG. 2 shows illustrative process 200. Process 200 may include network 202. Network augmentation system 216 may include AI module 218. AI module 218 may be configured to accept network architecture data 204. Network architecture data 204 may include digital network configuration maps 206. Network architecture data 204 may include digital network systems maps 208. Digital network configuration maps 206 and digital network systems maps 208 may include digital mappings of the layout of network 202.

Network architecture 204 may include digital images that correspond to network systems physical maps 210. Network architecture 204 may include digital images that correspond to network configuration physical maps 212. Digital images that correspond to network systems physical maps 210 and digital images that correspond to network configuration physical maps 212 may include scans of physical images of diagrams and structures of network 204.

Network architecture 204 may include physical network component images 214. Physical network component images 214 may include digital images of physical components of network 202. AI intelligence module 218 may be configured to accept and analyze network architecture data 204.

Figure 3:
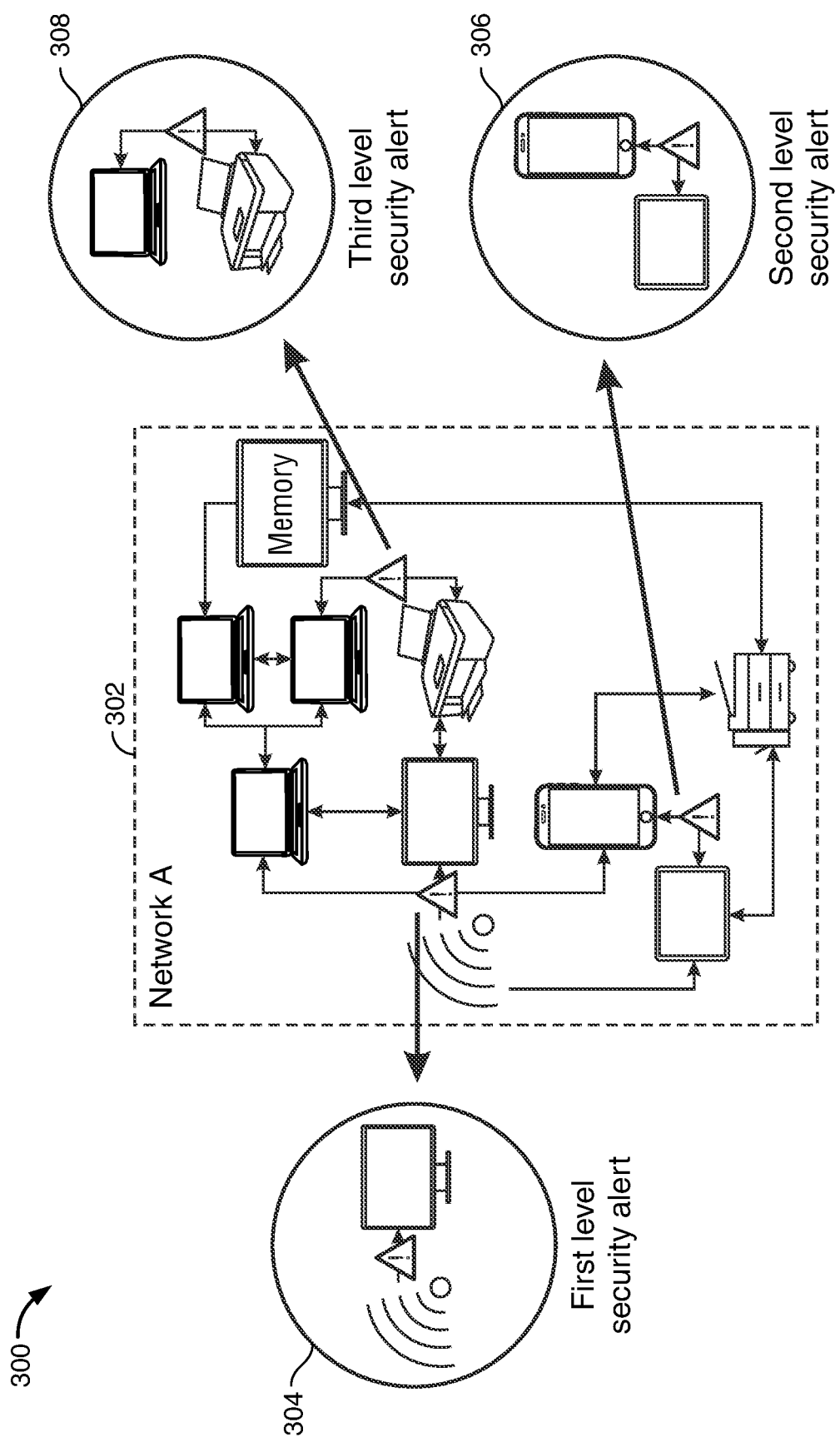
FIG. 3 shows yet another illustrative diagram in accordance with principles of the invention.

FIG. 3 shows illustrative diagram 300. Illustrative diagram 300 includes network map 302. Network map 302 may be a three-dimensional map of a network. Network map 302 may have been rendered by a network augmentation system (shown in FIG. 1).

Network map 302 may include security vulnerability tags 304, 306, and 308. The network augmentation system may tag security vulnerabilities through an AI module (shown in FIG. 1). The AI module may access public data, private data, and data relating to security standards. The AI module may use the retrieved data to identify security vulnerabilities. The AI module may tag the identified security vulnerabilities on network map 302.

Security vulnerability 304 may be identified as a first level security alert. A first level security alert may be a high security alert. Security vulnerability 304 may be identified as a high-level security alert using the data retrieved by the AI module. Security vulnerability 306 may be identified as a second level security alert. A second level security alert may be a medium level security alert. Security vulnerability 306 may be identified as a medium level security alert using the data retrieved by the AI module. Security vulnerability 308 may be identified as a third level security alert. A third level security alert may be a low-level security alert. Security vulnerability 308 may be identified as a low-level security alert using the data retrieved from the AI module.

The identified security vulnerabilities 304, 306, and 308 may be prioritized in a priority list. Security vulnerabilities 304, 306, and 308 may prioritized based on the identified level of the corresponding security alert. The higher the alert, the higher the vulnerability may be prioritized. For example, security vulnerability 304 would be highest on the priority list, while security vulnerability 308 may be lowest on the priority list.

Figure 4:
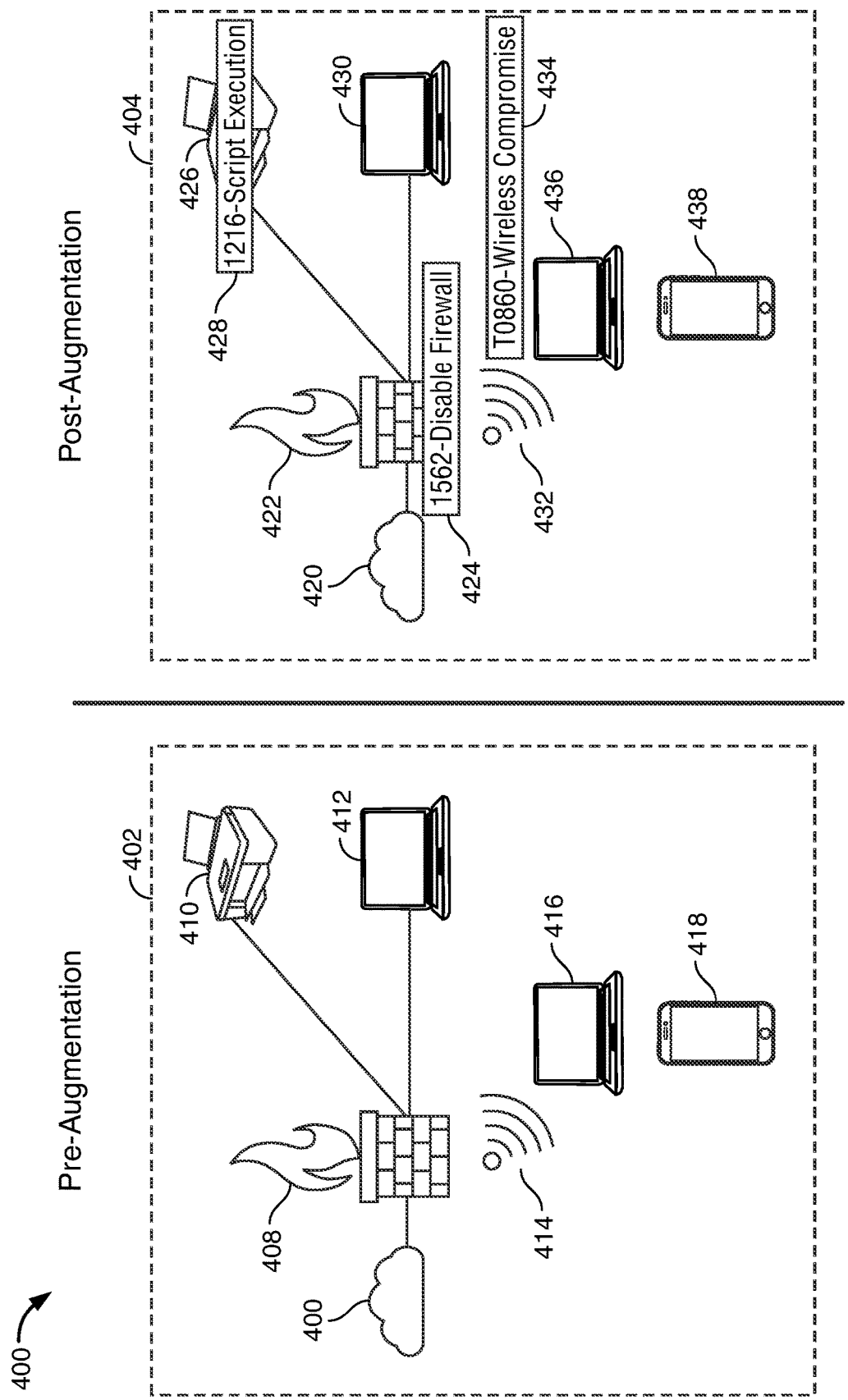
FIG. 4 shows still another illustrative diagram in accordance with principles of the invention.

FIG. 4 shows illustrative diagram 400. Illustrative diagram 400 includes pre-augmentation network 402 and post-augmentation network 404 of a network augmented through the network augmentation system. Network 402 may include cloud 406, firewall 408, end points 410, 412, 416 and 418, and Wi-Fi 414.

Post augmentation network 404 may be a three-dimensional map of network 402. Network 404 may include three-dimensional representations of the components included in network 404. Network 404 may include representative cloud 420, representative firewall 422, representative end points 426, 430, 436, and 438, and representative Wi-Fi 432.

Post augmentation network 404 may include a security vulnerability layer. The security vulnerability layer may include security tags 424, 428, and 434. Security tag 424 may be related to firewall 422. Security tag 424 may indicate that firewall 422 is not strong enough. Security tag 424 may indicate that firewall 422 was already broken into. Security tag 428 may be related to end point 426. End point 426 may be a printer. Security tag 428 may indicate that the connection from cloud 420 to printer 426 may not be secure. Security tag 434 may be related to Wi-Fi 432. Security tag 434 may indicate that Wi-Fi 432 is compromised. Each security tag may identify different security vulnerabilities with the network.

Figure 5:
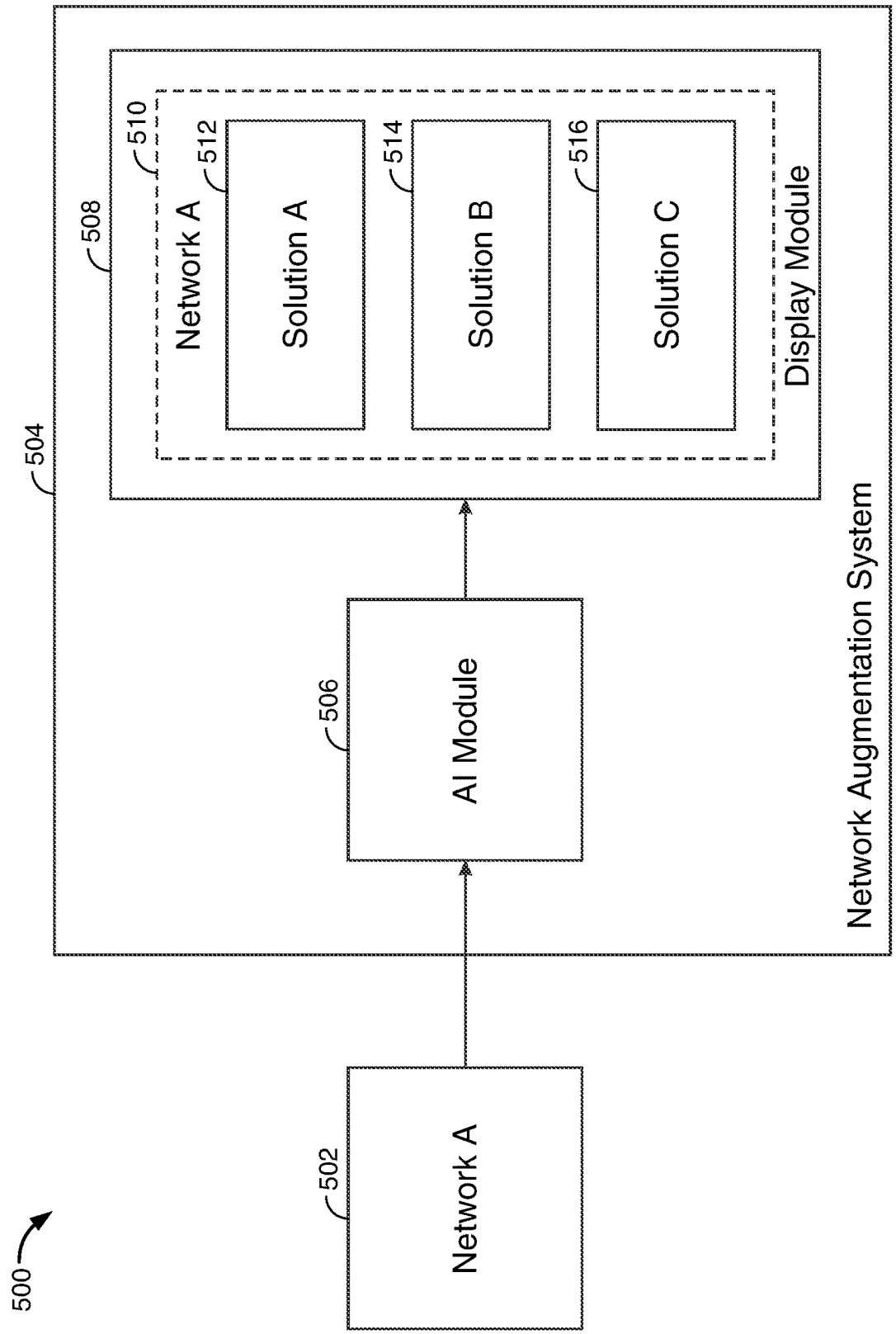
FIG. 5 shows yet another illustrative diagram in accordance with principles of the invention.

FIG. 5 shows illustrative diagram 500. Illustrative diagram 500 may include network 500. Illustrative diagram 500 may include network augmentation system 504. Network augmentation system 504 may include AI module 506. Network 502 may be augmented through network augmentation system 504. Network augmentation system 504 may include display module 508.

Display module 508 may display three-dimensional map 510 of network 502. Display module 508 may include projected solutions 512, 514 and 516. Projected solutions 512, 514, and 516 may be solutions to identified security vulnerabilities (shown in FIGS. 3. and 4.) within network 502. Projected solutions 512, 514, and 516 may be different solutions to the same identified security vulnerability. Projected solutions may be different solutions to different identified security vulnerabilities. Projected solutions 512, 514, and 516 may change network 502 differently. A user may choose a desired solution from the displayed solutions.

Figure 6:
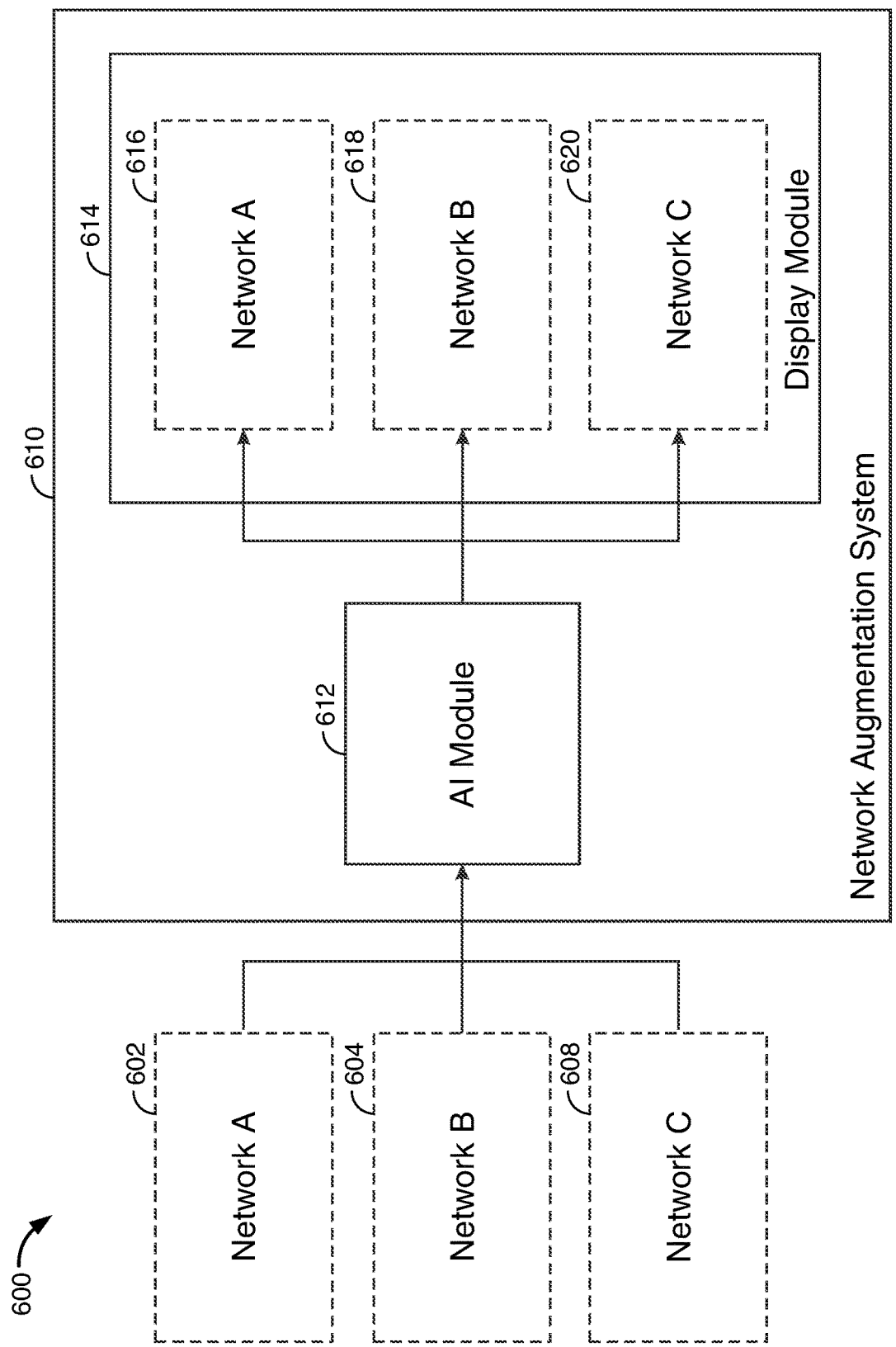
FIG. 6 shows still another illustrative diagram in accordance with principles of the invention.

FIG. 6 shows illustrative diagram 600. Illustrative diagram 600 may include network 602. Illustrative diagram 600 may include network 604. Illustrative diagram may include network 608. Network 602, 604, and 608 may be different networks. Illustrative system 600 may include network augmentation system 610. Network augmentation system 610 may include AI module 612. Network augmentations system 610 may include display module 614.

Network augmentation system 610 may augment networks 602, 604, and 608. Network augmentation system 610 may use AI module 612 to render three-dimensional maps of networks 602, 604 and 608. Network augmentation system 610 may use AI module 612 to generate the three-dimensional maps for networks 602, 604 and 608. Network augmentation system 610 may display the three-dimensional maps on display module 614.

Network augmentation system 610 may render an individual map for each of networks 602, 604, and 608. Augmented network 616 may be a three-dimensional map of network 602. Augmented network 618 may be a three-dimensional map of network 604. Augmented network 620 may be a three-dimensional map of network 608.

Figure 7:
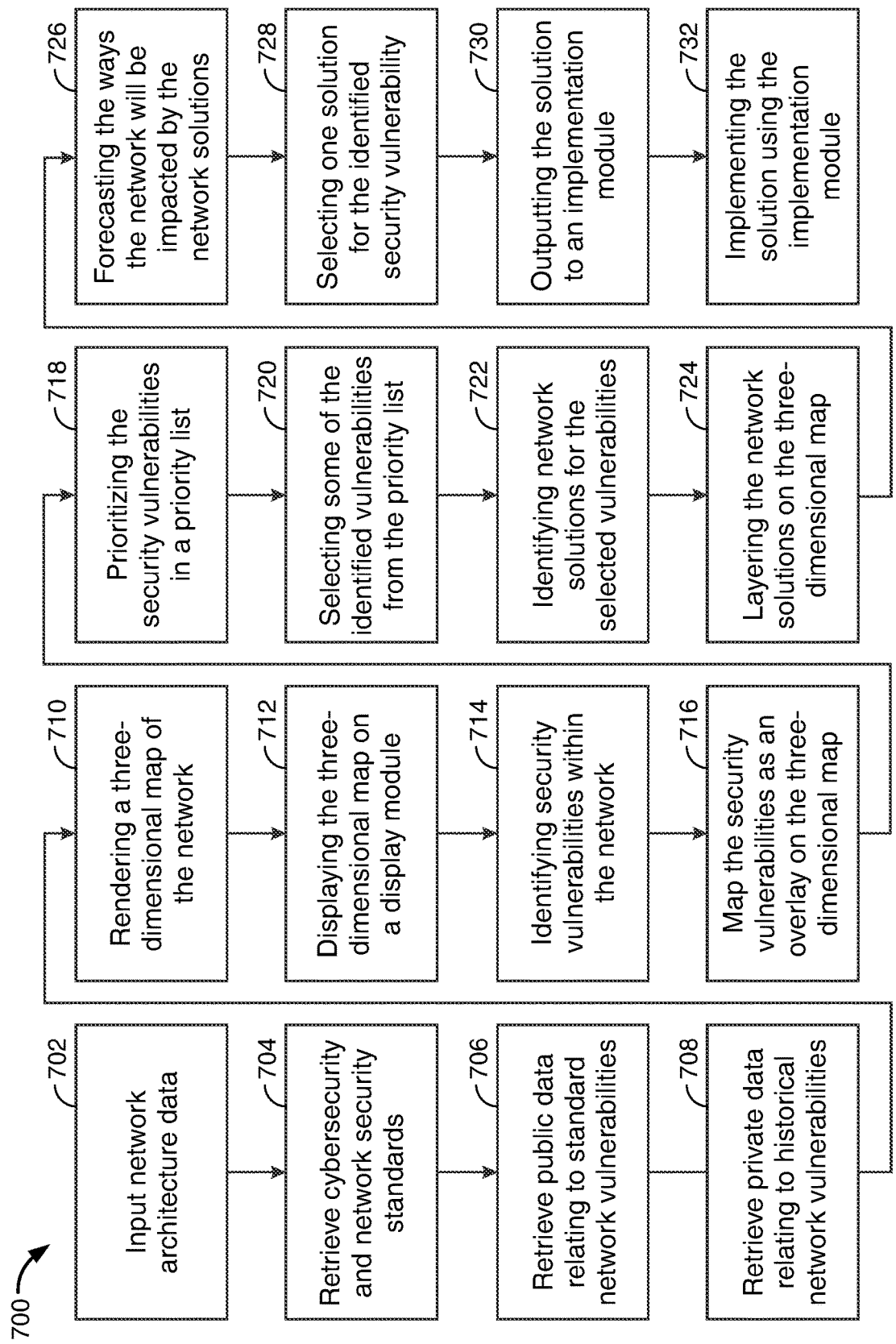
FIG. 7 shows yet another illustrative diagram in accordance with principles of the invention.

FIG. 7 shows illustrative process 700. Step 702 may include inputting network architecture in a network augmentation system. Step 704 may include retrieving cybersecurity and network security standards from a public database. The public database may be located at an internet location. Step 706 may include retrieving public data relating to standard network vulnerabilities. The public data may be from a public database. The public database may be located at an internet location. Step 708 may include retrieving private data relating to historical network vulnerabilities relating to the network. The private data may be retrieved from a private database. The private database may be located on a memory stored as part of the network.

Step 710 may include rendering a three-dimensional map. The three-dimensional map may be rendered using the network architecture input in step 702. Step 712 may include displaying the three-dimensional map on a display module. Step 714 may include identifying security vulnerabilities within the network. The identification may be based on data collected in steps 704 through step 708. Step 716 may include mapping the identified security vulnerabilities onto the three-dimensional map.

Step 718 may include prioritizing the security vulnerabilities in a priority list. The vulnerabilities may be prioritized from a highest level alert to a lowest level alert. Step 720 may include selecting some of the identified vulnerabilities from the priority list. There may be one or more identified vulnerabilities. The identified vulnerabilities may be larger than a threshold number of vulnerabilities. The threshold number of vulnerabilities may be the number of vulnerabilities that are processable the network augmentation system. Additionally, some of the identified vulnerabilities may be insignificant to the network. Therefore, a user may select a portion of the identified vulnerabilities to analyze. The portion of the identified vulnerabilities may correspond to the threshold number of vulnerabilities. The portion of the identified vulnerabilities may correspond to a subset of the threshold number of vulnerabilities. Step 722 may include identifying network solutions for the selected vulnerabilities. Step 724 may include layering the identified solutions on the map of the three-dimensional network.

Step 726 may include forecasting the possible changes that may occur to the network based on the identified network solutions. Step 728 may include selecting one solution from the identified solutions for implementation. Step 730 may include outputting the selected solution to an implementation module. The implementation module may be included in the network. The implementation module may have direct communication with the network. Step 732 may include implementing the selected solution at the network, using the implementation module.

Thus, methods and apparatus for AUGMENTED AND VIRTUAL REALITY SECURITY PLANNER are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. A method for virtual network augmentation, the method comprising:
    inputting network architecture data into a network augmentation system, said network architecture data corresponding to a network, said network architecture data comprising:
        a plurality of physical network component images;
        a plurality of digital network systems maps;
        a plurality of digital network configurations maps;
        a plurality digital images that correspond to network systems physical maps; and
        a plurality of digital images that correspond to network configurations physical maps;
    retrieving, from a public database, data relating to cybersecurity standards;
    retrieving, from a public database, data relating to network security standards;
    retrieving, from a public database, publicly stored data relating to standard network vulnerabilities;
    retrieving, from a private database, privately stored data relating to historical vulnerabilities, said historical vulnerabilities having occurred within the network;
    rendering a three-dimensional map of the network using the network architecture data;
    displaying the three-dimensional map on an interactive display module;
    identifying one or more security vulnerabilities applicable to the network based on the data relating to cybersecurity standards, the data relating to network security standards, the publicly stored data, and the privately stored data;
    mapping the one or more identified security vulnerabilities as an overlay to the three-dimensional map;
    prioritizing the one or more identified security vulnerabilities in a priority list based on metadata associated with the publicly stored data and privately stored data;
    selecting a first number of identified security vulnerabilities from the priority list;
    identifying, using an artificial intelligence module, one or more network solutions for each of the selected vulnerabilities;
    layering the one or more network solutions at network locations that correspond to the selected vulnerabilities on the three-dimensional map;
    forecasting, within the three-dimensional map, one or more ways the network will be affected in response to the one or more network solutions;
    selecting through the display module, a first solution from the one or more solutions for implementation;
    outputting the first solution to an implementation module; and
    implementing the first solution using the implementation module.

2. The method of claim 1 wherein the private database is a memory stored at the network.

3. The method of claim 2 wherein the memory operates in tandem with a hardware processor.

4. The method of claim 1 the method further comprising tagging each identified security vulnerability with a tag icon.

5. The method of claim 4 wherein the tag icons are togglable.

6. The method of claim 1 the method further comprising displaying a user using the network augmentation system as an icon within the three-dimensional map.

7. The method of claim 1 wherein the interactive display module is a virtual reality headset.

8. The method of claim 1 wherein the interactive display module is a screen.

9. The method of claim 1 the method further comprising interacting, in real time, between the network augmentation system and the network.

10. The method of claim 1 wherein the metadata includes:
severity metrics of an identified security vulnerability;
frequency of an identified security vulnerability;
outcome of an identified security vulnerability; and
resolution to an identified security vulnerability.

11. An apparatus for virtual network augmentation, the apparatus comprising:
a network;
a public database, the public database configured for retrieval of:
data relating to:
cybersecurity standards; and
network security standards; and
publicly stored data, said publicly stored data relating to standard network vulnerabilities;
a private database, the private database configured for retrieval of privately stored data relating to historical vulnerabilities, said historical vulnerabilities having occurred within the network;
a network augmentation system, the network augmentation system configured to:
input network architecture data into a network augmentation system, said network architecture data corresponding to a network, said network architecture data including:
a plurality of physical network component images;
a plurality of digital network systems maps;
a plurality of digital network configurations maps;
a plurality digital images that correspond to network systems physical maps; and
a plurality of digital images that correspond to network configurations physical maps;
render a three-dimensional map of the network using the network architecture data;
display the three-dimensional map on an interactive display module;
identify one or more security vulnerabilities applicable to the network based on the data relating to cybersecurity standards and network security standards, the publicly stored data, and the privately stored data;
map the one or more identified security vulnerabilities as an overlay to the three-dimensional map;
prioritize the one or more identified security vulnerabilities in a priority list based on metadata associated with the publicly stored data and the privately stored data;
select a first number of vulnerabilities from the priority list;
identify, using an artificial intelligence module, one or more network solutions for each of the selected vulnerabilities;
layer the one or more network solutions at network locations that correspond to the selected vulnerabilities, on the three-dimensional map;
forecast, within the three-dimensional map, one or more ways the network will be affected in response to the one or more network solutions;
select, through the display module, from the one or more solutions, for implementation;
output, the first solution to an implementation module; and
implement the first solution at the implementation module.

12. The apparatus of claim 11 wherein the private database is a memory stored at the network.

13. The apparatus of claim 12 wherein the memory operates in tandem with a hardware processor.

14. The apparatus of claim 11 wherein the method further comprises tagging each potential vulnerability with a tag icon.

15. The apparatus of claim 14 wherein the tag icons are togglable.

16. The apparatus of claim 11 wherein the apparatus is further configured to display a user using the network augmentation system as an icon within the three-dimensional map.

17. The apparatus of claim 11 wherein the interactive display module is a virtual reality headset.

18. The apparatus of claim 11 wherein the interactive display module is a screen.

19. The apparatus of claim 11 wherein the network augmentation system is further configured to interact, in real time, with the network.

20. The apparatus of claim 11 wherein the metadata includes:
severity metrics of an identified security vulnerability;
frequency of an identified security vulnerability;
outcome of an identified security vulnerability; and
resolution to an identified security vulnerability.

\* \* \* \* \*